United States Patent [19]

Chin et al.

[11] Patent Number: 5,524,267
[45] Date of Patent: Jun. 4, 1996

[54] DIGITAL I/O BUS CONTROLLER CIRCUIT WITH AUTO-INCREMENTING, AUTO-DECREMENTING AND NON-INCREMENTING/DECREMENTING ACCESS DATA PORTS

[75] Inventors: Arthur L. Chin, Boca Raton; Serafin J. E. Garcia, Jr., Lake Worth; Don S. Keener, Boca Raton; Gregory J. Moore, Boca Raton; Stephanie P. Payne, Boca Raton; Eric S. Stine, Delray Beach, all of Fla.

[73] Assignee: International Business Machines Corporation, Armonk, N.Y.

[21] Appl. No.: 220,793

[22] Filed: Mar. 31, 1994

[51] Int. Cl.⁶ .................................................. G06F 13/20
[52] U.S. Cl. .......................... 395/823; 395/824; 395/835; 395/837; 395/866
[58] Field of Search .................................. 395/309, 310, 395/823, 824, 835, 837, 867, 868, 866; 365/189.03

[56] References Cited

U.S. PATENT DOCUMENTS

| | | | |
|---|---|---|---|
| 4,177,512 | 12/1979 | Moggia | 395/866 |
| 5,150,328 | 9/1992 | Aichelmann, Jr. | 365/189.03 |
| 5,166,903 | 11/1992 | Aichelmann, Jr. | 365/189.03 |
| 5,187,795 | 2/1993 | Balmforth et al. | 395/800 |
| 5,214,760 | 5/1993 | Hammond et al. | 395/250 |
| 5,235,689 | 8/1993 | Baker et al. | 395/309 |

*Primary Examiner*—David L. Robertson
*Attorney, Agent, or Firm*—Calfee, Halter & Griswold; R. S. Babayi

[57] ABSTRACT

A digital bus circuit having an Address/Data port select decoder 170 in circuit communication with a Selector 194, a Data Port Buffer/Register 181, and an Address Port register 208. The Selector 194 is in circuit communication with an auto incrementor 216, an auto decrementor 218, and a polling function. The incrementor 216 serves to automatically increment an address present in the Address port register 208. The decrementor 218 serves to automatically decrement an address present in the Address port register 208. The polling function serves to reload the Address port register 208 with the same address. The present invention allows a number of enhanced programming methods which permit input and output operations to be implemented with fewer program code instructions. One of the programming methods disclosed by the present invention is an enhanced method of "polling" a device's internal register by accessing the polling function.

13 Claims, 10 Drawing Sheets

DIGITAL I/O BUS CONTROLLER CIRCUIT WITH AUTO-INCREMENTING, AUTO-DECREMENTING AND NON-INCREMENTING/DECREMENTING ACCESS DATA PORTS

BACKGROUND OF THE INVENTION

1. Field of the Invention

The present invention relates generally to digital systems, especially to such digital systems utilizing processor based devices that are input/output intensive and, more specifically to a digital I/O bus controller circuit with auto-incrementing, auto-decrementing, and non incrementing/decrementing access data ports.

2. Description of Prior Art

Personal Computer systems in general and IBM personal computers in particular have attained widespread use for providing computer power to many segments of today's modern society. A Personal computer system can usually be defined as a desk top, floor standing, or a portable microcomputer that is comprised of a system unit having a single system processor and associated volatile and non-volatile memory, a display monitor and/or other output devices, a keyboard and/or other input devices, one or more diskette drives, a fixed disk storage, and, optionally, a printer. One of the distinguishing characteristics of these systems is the use of a mother board or system planar to electrically connect these components together. These systems are designed primarily to give independent computing power to a single user and are inexpensively priced for purchase by individuals or small businesses. Examples of such personal computer systems are IBM's PERSONAL COMPUTER AT and IBM's PERSONAL SYSTEM/2.

These systems can be classified into two general families. The first family, usually referred to as Family I Models, use a bus architecture exemplified by the IBM PERSONAL COMPUTER AT and the other Industry Standard Architecture (ISA) machines. The second family, referred to as Family II Models, use IBM's MICRO CHANNEL bus architecture exemplified by IBM's PERSONAL SYSTEM/2.

The Family I models typically have used the popular INTEL 8088 or 8086 microprocessor as the system processor. These processors have the ability to address one megabyte of memory.

The Family II models typically use the high speed INTEL 80286, 80386, and 80486 microprocessors which can operate in a real mode to emulate the slower speed INTEL 8086 microprocessor or a protected mode which extends the addressing range from megabytes to gigabytes for some models. In essence, the real mode feature of the 80286, 80386, and 80486 processors provide hardware compatibility with software written for the 8086 and 8088 microprocessors.

The development of personal computer systems is an extremely competitive industry. There are many standards by which personal computer systems are judged. Some of the more important standards are affordability, expandability, processor type and speed, and overall system speed. One of the most important criteria by which a computer system is judged by is the system price compared to the overall system speed.

A computer system's overall speed is commonly influenced by: a) the system processor's operating speed, b) the input and output data transfer rates within the system, and c) the efficiency with which the instruction code is implemented.

Normally, the system processor has the largest influence on the system's overall speed. A processor's speed is largely determined by the time required for the processor to execute a single program instruction, or alternatively, the number of program instructions that the processor can execute in one second. Fast processors, such as the INTEL 80486, execute instructions in the range of millions of instructions per second. The term "millions of instructions per second" is generally referred to by the acronym "MIPS".

Often, input and output devices have data transfer rates that are slower than the system processor's. As a result, the system processor must "wait" until the data transfer is complete before it can proceed to execute the next program instruction.

Typically, the system processor accomplishes this "wait" through its programming code. A common method used is to create a set of program instructions that will continuously test an input/output status bit to determine if the data transfer is complete. The instruction set usually creates a continuous loop that tests this status bit repeatedly until a test condition is satisfied.

The efficiency with which the instruction code is implemented also influences the computer system speed. Each program instruction takes a finite time to be executed within the system processor. Execution time generally varies depending on what type of program instruction is being executed. The standard listed for a particular system processor is generally the average time required for execution of an instruction. Given that a system processor requires a finite length of time to execute a single program instruction, it can generally be said that the time to execute three instructions will be less than the time required to execute four instructions. Thus, if a function could be implemented in three instructions instead of four, it would create the desirable parallel effects of (a) a quicker execution time and (b) a reduction in the amount memory necessary to store the program.

Conventional processor based devices, generally, perform input and output operations through a single address port and a single data port. A program must first load the address port with an address of a device's internal register and then either read the register data, or write data to the register, via the data port.

A system processor must, at times, also "poll" a device register. The system processor "polls" a device register when it executes many reads from the register to determine if a device's status has changed so that the program can continue onto the next operation. In a conventional processor based device, "polling" requires that the address port be reloaded constantly with the address of the device's internal register that is being "polled".

In an input and output intensive computer system, many read and write functions are necessary to transfer data within the system. The amount of program code required to implement such functions is directly related to the system's hardware architecture. For a conventional system architecture with a single address port and a single data port, the required number of program code instructions can be large. The resulting effect on the computer system is three fold. First, more memory will be required to store the program code. Second, a larger memory requirement for the system will increase the bill of materials and the system's price. Third, the computer system's overall operating speed will be reduced due to a large number of program instructions required to be executed by the system processor for the data transfers.

In Summary, conventional processor based computer systems suffer from a number of disadvantages when they are required to perform a large number of input and output operations:

(a) They include a single address port and single data port;

(b) They require a large amount of memory to store the program code required to perform the large number of input and output operations and as a result increased costs in providing more memory; and (c) Intensive input and output operations require a system processor to execute many program instructions, such as "polling", which tend to reduce the overall computer system's speed.

SUMMARY, RAMIFICATIONS, AND SCOPE

The present invention is utilized to increase the efficiency with which a computer system transfers information between input/output devices and a system's processor and local bus. The present invention includes a register pointer in circuit communication with pointer generation circuitry and a plurality of registers. The pointer generation circuity is adapted to receive a first, second, third and forth address from the system processor via an address bus. Accessing the first address causes the pointer generation circuity to decrement the register pointer. Accessing the second address causes the pointer generation circuitry to increment the register pointer. Accessing the third register address causes the current value stored in the register pointer to be preserved. Accessing the fourth register address causes a new value to be loaded into the register pointer. By accessing the first, second, or third addresses, a programming instruction that would normally be required to perform these functions on the register pointer would be eliminated.

Accordingly, the reader will see that the present invention can be used to provide a computer system that performs input and output operations more efficiently by decreasing the number of program instructions required for such operations. By reducing the number of program instructions necessary, the system's speed will be increased because the system processor does not have to execute as many instructions.

Several advantages of the present invention are:

a) To provide a digital I/O bus controller circuit that comprises at least one non incrementing/decrementing data port. This will allow polling of a device's internal register without having to reload the device's internal register address every time a poll operation is performed.

b) To provide a computer system that performs input and output operations more efficiently by reducing the number of program instructions required to implement these operations. By reducing the number of program instructions necessary, the computer system's speed will be increased because the system processor does not have to execute as many instructions.

c) To provide a computer system that requires less program code and memory to implement input and output operations. By requiring less program code, the amount of system memory (RAM and/or ROM) can be reduced. This would improve the system performance, and allow the system to be more competitively priced.

d) To provide a computer system that comprises a plurality of data ports to facilitate the computer system's input and output operations.

Further advantages of the present invention will become apparent from a consideration of the drawings and ensuing description.

DRAWING FIGURES

DESCRIPTION OF THE ILLUSTRATED EMBODIMENT

Figure 1:
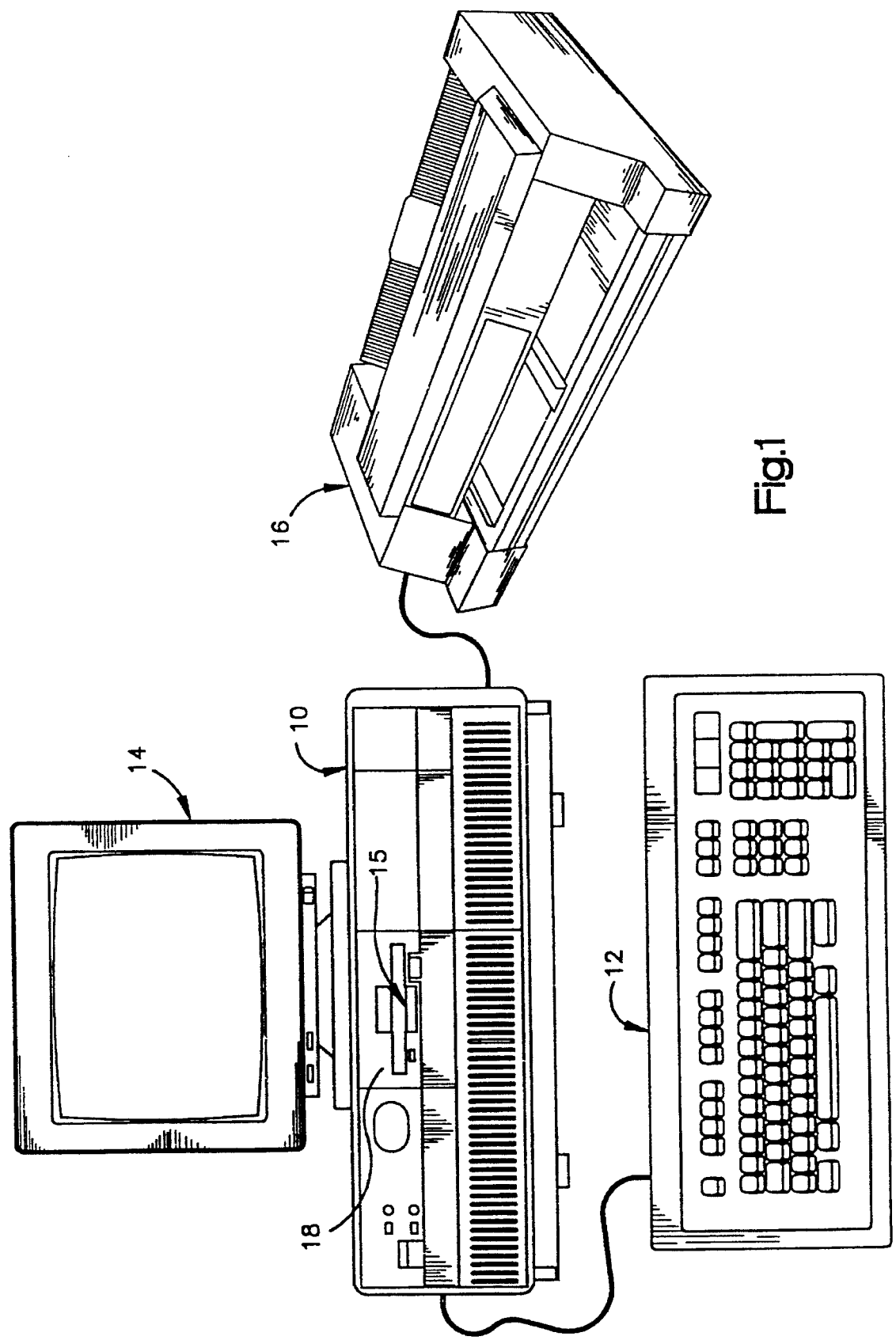
FIG. 1 is a perspective view of a personal computer with one digital I/O bus circuit comprising at least one non incrementing/decrementing access data port.

Referring now to the drawings, and for the present to FIG. 1, a microcomputer embodying the present digital bus circuit of the present invention is shown and generally indicated at 10. As mentioned hereinabove, the computer 10 may have an associated monitor 14, keyboard 12 and printer or plotter 16.

Figure 2:
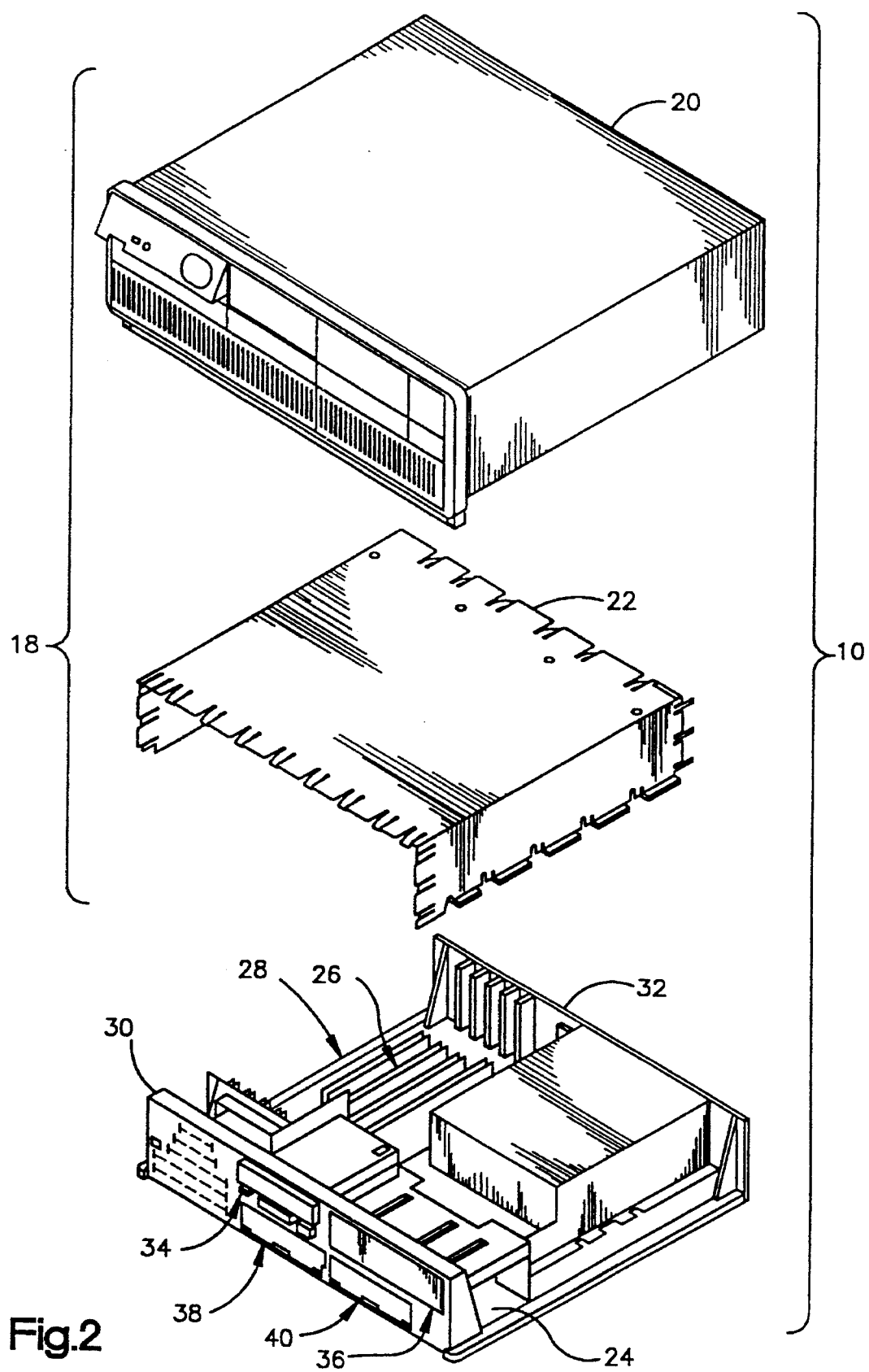
FIG. 2 is an exploded perspective view of certain elements of the personal computer of FIG. 1 including a chassis, a cover, an electromechanical direct access storage device and a planar board, illustrating certain relationships among those elements.

Referring now to FIG. 2, the computer 10 has a cover 18 formed by a decorative outer member 20 and an inner shield member 22 which cooperate with a chassis 28 in defining an enclosed, shielded volume for receiving electrically powered data processing and storage components for processing and storing digital data. At least certain of these components are mounted on a multi-layer planar board 26 or mother board which is mounted on the chassis 28 and provides a structure for electrically interconnecting the components of the computer 10 including those identified above and such other associated elements as floppy disk drives, various forms of direct access storage devices, accessory cards or boards, and the like. As pointed out more fully hereinafter, provisions are made in the planar board 26 for the passage of input/output signals to and from the operating components of the microcomputer.

Still referring to FIG. 2, the chassis 28 has a base indicated at 24, a front panel indicated at 30, and a rear panel indicated at 32. The front panel 30 defines at least one open bay (and in the form illustrated, four bays) for receiving a data storage device such as a disk drive for magnetic or optical disks, a tape backup drive, or the like. In the illustrated form, a pair of upper bays 34, 36 and a pair of lower bays 38, 40 are provided. One of the upper bays 34 is adapted to receive peripheral drives of a first size (such as those known as 3.5 inch drives) while the other bay 36 is adapted to receive drives of a selected one of two sizes (such as 3.5 and 5.25 inch) and the lower bays are adapted to receive devices of only one size (3.5 inch). One floppy disk drive is indicated at 15 in FIG. 1, and is a removable media direct access storage device capable of receiving a diskette inserted thereinto and using the diskette to receive, store and deliver data as is generally known.

Figure 3:
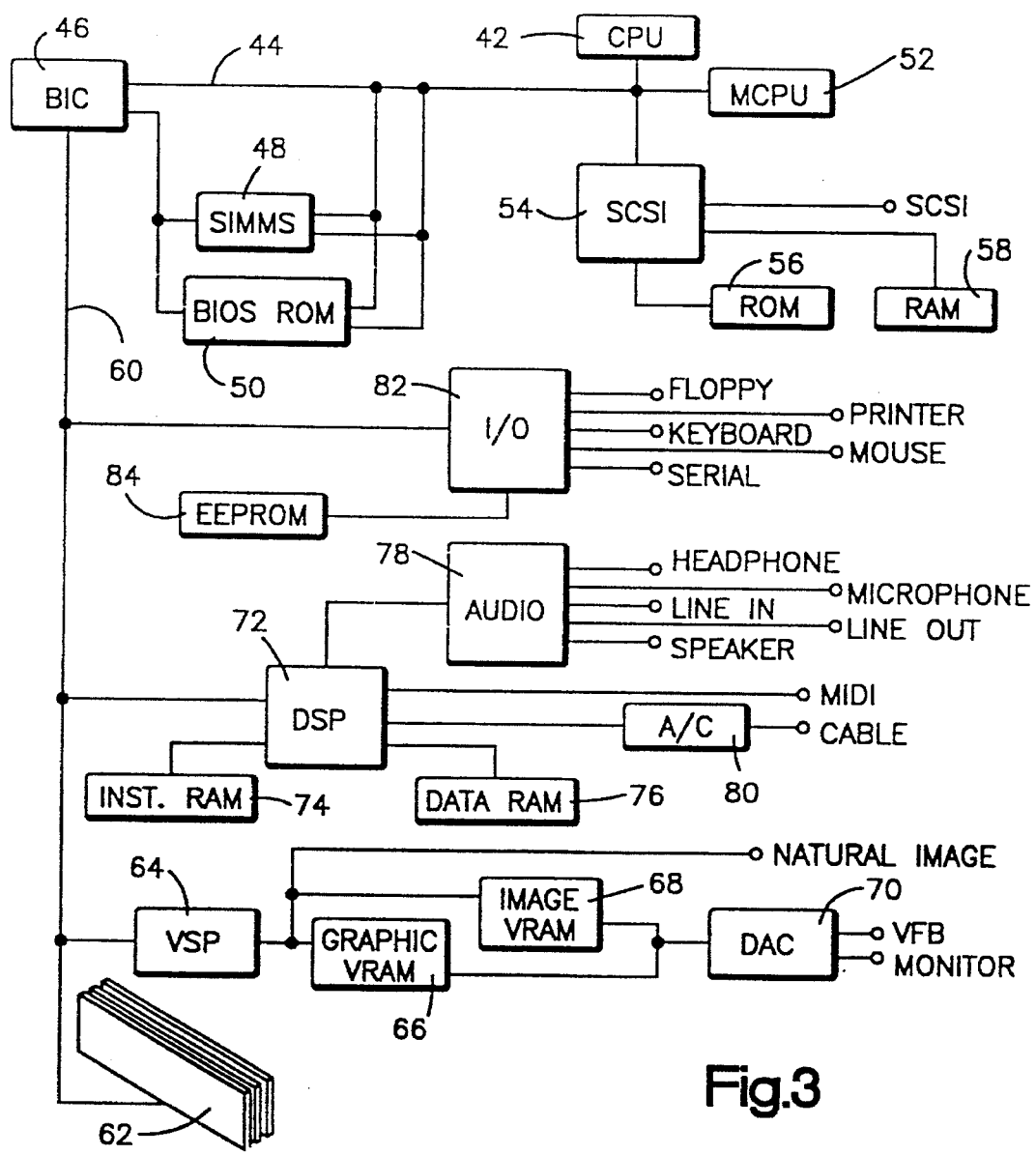
FIG. 3 is a schematic view of certain components of the personal computer of FIGS. 1 and 2.

Prior to relating the above structure to the present invention, a summary of the operation in general of the personal computer system 10 merits review. Referring to FIG. 3, there is shown a block diagram of a personal computer system illustrating the various components of the computer system 10 in accordance with the present invention, including components mounted on the planar 26 and the connection of the planar to the I/O slots and other hardware of the personal computer system. Connected to the planar board 26 is the system processor 42. While any appropriate microprocessor can be used as the CPU 42, one suitable microprocessor is the 80486 which is sold by Intel Corp. The CPU 42 is connected by a high speed CPU local bus 44 to a bridge/memory controller 46, to volatile random access memory (RAM) 48 here shown as Single Inline Memory Modules (SIMMs) and to BIOS ROM 50 in which is stored instructions for basic input/output operations to the CPU 42. The BIOS ROM 50 includes the BIOS that is used to interface between the I/O devices and the operating system of the microprocessor 42. Instructions stored in ROM 50 are copied into RAM 48 to decrease the execution time of BIOS.

While the present invention is described hereinafter with particular reference to the system block diagram of FIG. 3, it is to be understood that the present invention may be used in conjunction with other hardware configurations of the planar board. For example, the system processor could be an Intel Pentium microprocessor.

Returning now to FIG. 3, the CPU local bus 44 (comprising data, address and control components) also provides for the connection of the microprocessor 42 with a math coprocessor 52 and a Small Computer Systems Interface (SCSI) controller 54. The SCSI controller 54 is connected with Read Only Memory (ROM) 56, RAM 58, and suitable external devices of a variety of types as facilitated by the I/O connection indicated to the right in the Figure. The SCSI controller 54 functions as a storage controller in controlling storage memory devices such as fixed or removable media electromagnetic storage devices (also known as hard and floppy disk drives respectively), and other types of storage devices such as electro-optical drives and tape drives.

The bridge/memory controller (hereinafter bridge) 46 couples the CPU local bus 44 with an I/O bus 60. By means of the bus 60, the bridge 46 is coupled with an optional feature bus such as a Peripheral Component Interconnect (PCI) bus having a plurality of I/O slots for receiving Peripheral Component Interconnect standard adapter cards 62 which may be further connected to an I/O device or memory (not shown). The I/O bus 60 includes address, data, and control components.

Coupled along the I/O bus 60 are a variety of I/O components such as a video signal processor (VSP) 64 which is associated with video RAM (VRAM) for storing graphic information (indicated at 66), and for storing image information (indicated at 68). Video signals exchanged with the processor 64 may be passed through a Digital to Analog Converter (DAC) 70 to a monitor, video frame buffer (VFB) or other display device. Provision is also made for connecting the VSP 64 directly with what is here referred to as a natural image input/output, which may be the form of a video recorder/player, camera, etc. (not shown). The I/O bus 60 may also be coupled with a Digital Signal Processor (DSP) 72 which has associated instruction RAM 74 and data RAM 76 available to store software instructions for the processing of signals by the DSP 72 and data involved in such processing. The DSP 72 provides for processing of audio inputs and outputs by the provision of an audio controller 78, and for handling of other signals by provision of an analog interface controller 80. Lastly, the I/O bus 60 is coupled with a input/output controller 82 with associated Electrical Erasable programmable Read Only Memory (EEPROM) 84 by which inputs and outputs are exchanged with conventional peripheral devices including floppy disk drives, a printer 16, keyboard 12, a mouse or pointing device (not shown), and a serial port.

The present invention is utilized to increase the efficiency with which a computer system transfers information between input/output devices and a system's processor and local bus. In broad terms, the present invention includes a register pointer in circuit communication with pointer generation circuitry and a plurality of registers. The pointer generation circuity is adapted to receive first, second, third and forth addresses from a system processor via an address bus. A software programmer may access any of the four addresses through programming code, or a compiler may be developed that would compile code to utilize the addresses.

Accessing the first address, which is assigned to the Auto decrementing data port, causes the pointer generation circuity to decrement the register pointer. Accessing the second address, which is assigned to the Auto incrementing data port, causes the pointer generation circuitry to increment the register pointer. Accessing the third register address, which is assigned to the Polling data port, causes the current value stored in the register pointer to be preserved. Accessing the fourth register address causes a new value to be loaded into the register pointer. By accessing the first, second, or third addresses, a program instruction that would normally be required to load the register pointer to the next address, or preserve the current address, is eliminated.

Figure 4:
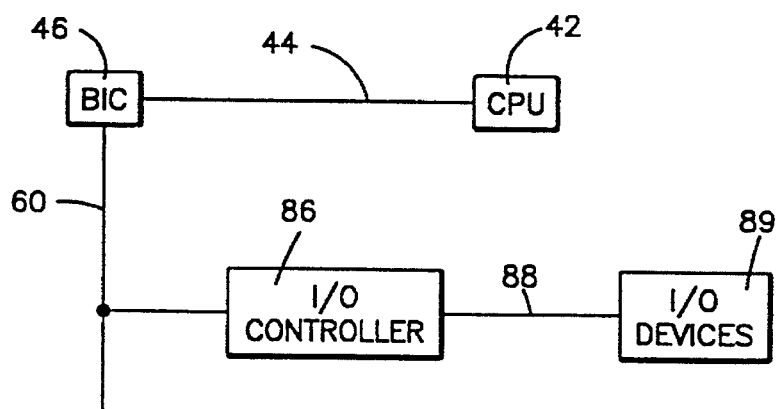
FIG. 4 is a block diagram illustrating the general interconnections of a digital I/O controller, incorporating the present invention, with its relationship to a system processor and system buses.

One preferred embodiment of this feature is shown in FIG. 4 as being incorporation into an I/O controller 86 of a computer system. The I/O controller 86 is interposed between two I/O buses, 60 and 88. The I/O bus 60 is a Peripheral Component Interconnect (hereinafter PCI) standard bus. The I/O bus 60 connects the I/O controller 86 to the bridge/memory controller 46 of a computer system. The bridge/memory controller 46 is electrically connected to a system processor 42 through a system processor local bus 44.

The I/O bus controller 86 is electrically connected to various I/O devices 89 (such as modems, hard disk controllers, serial interfaces, etc. (not shown)), through a second I/O bus 88. In the preferred embodiment, the second I/O bus 88 is a Small Computer System Interface (SCSI) bus. The I/O bus controller 86 would serve to translate I/O information between the two I/O buses, 60 and 88, and thereby allow the system processor 42 to communicate with devices on dissimilar bus standards. While the preferred embodiment illustrates a single I/O bus controller 86, a plurality of I/O bus controllers comprising the present invention can be incorporated into a computer system to control other buses that are not compatible with the main I/O bus 60.

Figure 5:
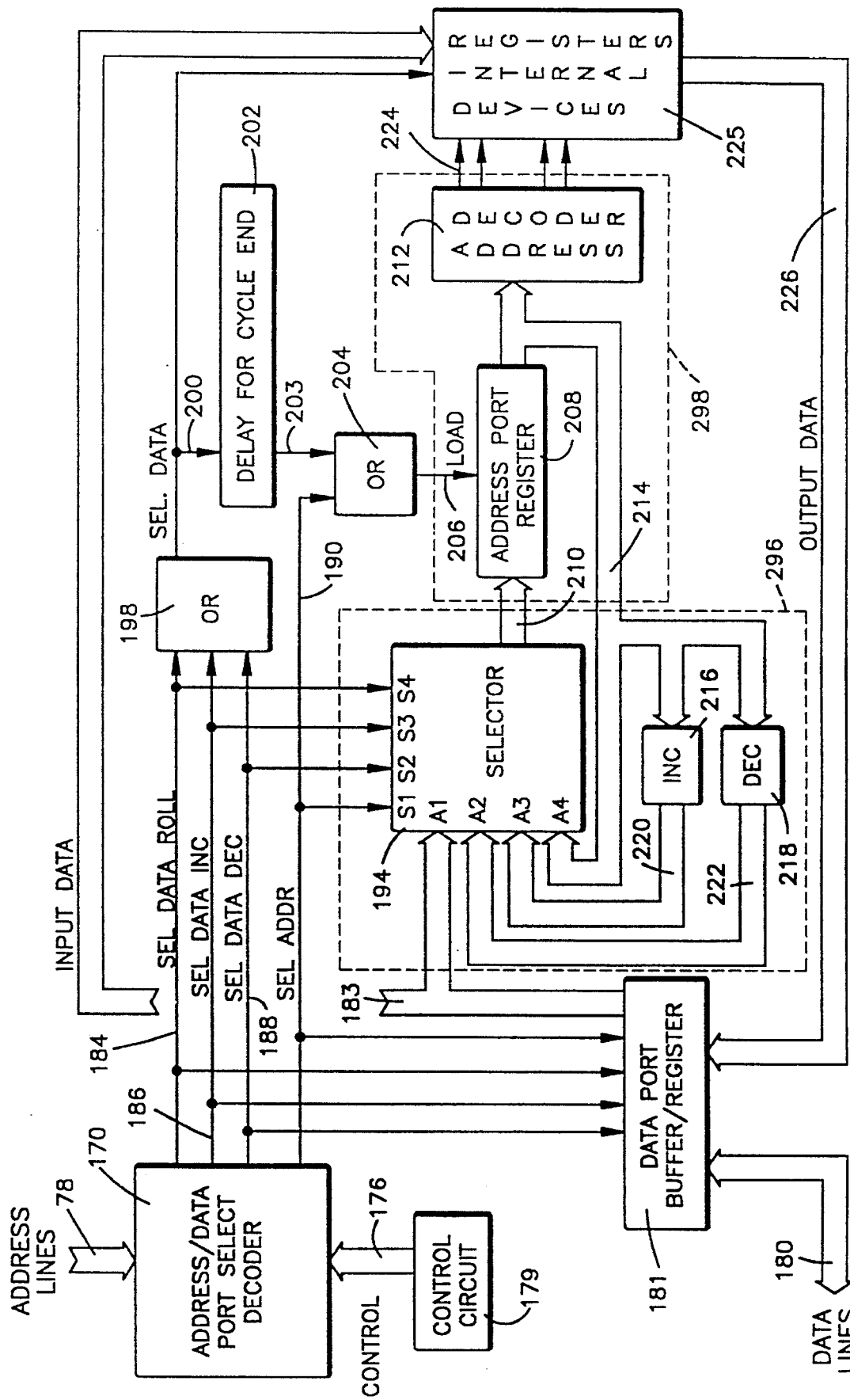
FIG. 5 is a block diagram illustrating the components and interconnections therebetween of the present invention.

FIG. 5 is a functional block diagram of the digital I/O bus controller circuit of the present invention. Address lines 178 from the system processor 42 (not shown in FIG. 5) are electrically connected to an Address/Data Port Select decoder 170. Design and implementation of decoder circuits are well known to those skilled in the art. The Address/Data Port Select decoder 170 decodes an incoming address on the address lines 178 to determine whether a Polling data port, an Auto incrementing data port, an Auto Decrementing data port, or a Write Address port is being accessed as will be described presently.

A Control element 179 is electrically connected to the Address/Data Port Select decoder 170 by means of a plurality of Control lines 176. The Control element 179 serves to control the timing sequences within the circuitry of the present invention. The Control element 179 utilizes a state machine that produces synchronizing logic from a host system processor's control, read, and write cycles to various data ports. The synchronizing logic ensures that an address is not incremented, decremented, or polled before a particular data port is accessed. The control lines 176 are electrically connected (by connections not shown) to all circuit elements to ensure proper synchronization.

The Address/Data Port Select decoder 170 is electrically connected to a three-input OR gate 198 and a Data Port Buffer/Register 181 by means of a Select Data poll line 184, a Select Data increment line 186, a Select Data decrement line 188, and a Select address line 190. Decoding of the address lines 178 by the Address/Data Port Select decoder 170 will allow a desired data or address port to be accessed based on its unique address. The Data Port Buffer/Register 181 is electrically connected to the system processor 42 (not shown in FIG. 5) via a plurality of Data lines 180.

The Data Port Buffer/Register 181 is connected to a plurality of device internal registers 225 by means of a plurality of Output data lines 226. The Data Port Buffer/Register 181 contains input and output registers that store data for the Polling data port, Auto incrementing data port, the Auto decrementing data port, or the write address port. The select lines, Select Data poll 184, Select Data increment 186, Select Data decrement 188, and Select address 190 serve to control which particular data port's (i.e. the Polling data port, the Auto incrementing data port, or the Auto decrementing data port, or the address port) register is being written to or read from. Design of input and output registers and control (or "enabling") circuits is well known to those skilled in the art.

A Delay for Cycle End control element 202 is electrically connected to the three-input OR gate 198 via a Select data line 200. The Delay for Cycle End control element 202 causes a wait to occur before another address is loaded and latched into the address port. This wait is to ensure that a data port has been accessed (read from or written to) completely before another input or output operation is performed. The Delay for Cycle End control element is achieved via the Control element 179. The Delay for Cycle End control element 202 is electrically connected to a two-input OR gate 204 via a Cycle complete line 203. The Cycle complete line 203 changes states when the Control element 179 determines that a particular data port access cycle has been completed.

The two-input OR gate 204 is electrically connected to the Address/Data Port Select decoder 170 via a Select address line 190. The two-input OR gate 204 serves to control a register pointer 298. The register pointer 298 comprises an writable Address Port register 208 and an Address decoder 212. The two-input OR gate 204 controls the Address Port register 208 through a Load Address line 206. Whenever a new address is required by a program instruction and the Delay for Cycle End control element 202 indicates an input/output operation is complete, the Load Address line 206 is driven high, causing the Address Port register 208 to be enabled and thereby loaded with a new register address.

The Address Port Register 208 is electrically connected to an Address Decoder 212 by means of a plurality of Internal Register address lines 214. The Address Decoder 212 decodes the register address stored in the Address Port Register 208 and causes a plurality of Select Internal Register Address lines 224 to become active with the register address value, thereby allowing the register addressed to be read from or written to via the Output data lines 226. The Select Internal Register Address lines 224 are electrically connected to the internal registers 225.

The Internal Register Address lines 214 connect the Address Port Register 208 to pointer generation circuitry 296. The pointer generation circuitry 296 comprises a Selector element 194, an Increment element 216, and a Decrement element 218. The Internal Register Address lines 214 serve to feed back a current device's internal register address into the pointer generation circuitry 296 so that the address may be incremented, decremented, or preserved.

The device's register address which is currently loaded in the register pointer 298 is fed into the Increment element 216 by the Internal Register Address lines 214. The Increment element 216 will increment the device register address by a value of one such as by Up/Down counters, decade counters, count-by-n circuits (where n=1 to any number), or other similar circuits. The Increment element 216 is electrically connected to the Selector 194 via a plurality of Increment Address lines 220. The Increment Address lines 220 are connected to input A3 on the Selector 194.

The device's register address which is currently in the register pointer 298 is also fed into the Decrement element 218 by the Internal Register Address lines 214. The Decrement element 218 will decrement the device register address by a value of one. A plurality of Decrement Address lines 222 electrically connect the Decrement element 216 to the Selector 194. The Decrement element 216 may implemented by Up/down counters, decade counters, subtract-by-n circuits (where n=1 to any number), or other similar circuits. The Decrement Address lines 222 are electrically connected to input A2 on the Selector 194. The Selector 194 is coupled to the Data port buffer/register 181 via a plurality of Data port buffer/register output lines 183 at input A1. The Data port buffer/register lines 183 also couple the Data port buffer/register 181 to the device internal registers 225 whereby input data to the device internal registers 225 is transferred. Design and Implementation of Selector elements are well known to those skilled in the art.

The Address port register 208 is electrically connected to the Selector 194 address input A4 via the Internal Register Address lines 214. When Selector 194 input S4 is driven high, the address present on the Internal Register Address lines 214 is passed-through Selector 194 and fed into the Address port register 208.

The Selector 194 is controlled by four select lines: the Select Data Poll line 184, Select Data Increment line 186, Select Data Decrement line 188, and the Select Address line 190. In other embodiments, the Selector may have more or less then four select lines depending on the number of functions desired to be selected. For example, the pointer generation circuity 296 may comprise of 2 or more increment elements which will increment a given address by separate values (i.e. one element will increment by a value of one (1) and the other will increment by a value of two (2)). Similarly, the pointer generation circuitry may comprise of 2 or more decrement elements in combination with the increment elements.

To facilitate an understanding of the operation, advantages and ramifications of the present invention, a discussion of the prior art programming methods will be reviewed first, followed by a description of an enhanced programming method presented by the present invention. A typical prior art method of programming consecutive incremental input and output functions is illustrated in machine independent program code in Table 2 and its associated flow chart is diagrammed in FIG. 6.

TABLE 2

Prior Art Incrementing Code

| | | | |
|---|---|---|---|
| OUT | ADDR_PORT,REG_ADDR | ; | load device internal address into address port |
| OUT | DATA_PORT, AL | ; | write data to device internal register |
| OUT | ADDR_PORT,REG_ADDR+1 | ; | load device internal address into address port |
| IN | AL, DATA_PORT | ; | read data from device internal register |
| OUT | ADDR_PORT,REG_ADDR+2 | | |
| IN | AL, DATA_PORT | | |
| OUT | ADDR_PORT,REG_ADDR+3 | | |
| OUT | DATA_PORT, AL | | |
| OUT | ADDR_PORT,REG_ADDR+4 | | |
| OUT | DATA_PORT, AL | | |
| OUT | ADDR_PORT,REG_ADDR+5 | | |
| IN | AL, DATA_PORT | | |
| OUT | ADDR_PORT,REG_ADDR+6 | | |
| OUT | DATA_PORT, AL | | |
| OUT | ADDR_PORT,REG_ADDR+7 | | |
| IN | AL, DATA_PORT | | |
| OUT | ADDR_PORT,REG_ADDR+8 | | |
| OUT | DATA_PORT, AL | | |
| OUT | ADDR_PORT,REG_ADDR+9 | | |
| IN | AL, DATA_PORT | | |
| OUT | ADDR_PORT,REG_ADDR+10 | | |
| IN | AL, DATA_PORT | | |

The Selector 194 is electrically connected to the Address Port Register 208 via a plurality of Selector Output address lines 210. The Selector lines 184, 186, 188, 190, designate which address input lines 183, 216, 220, or 222, will be placed on the Selector Output address lines 210 (See Table 1 for Selector 194 output definitions).

TABLE 1

| | Selector Input | | | |
|---|---|---|---|---|
| Selector Output | S1 | S2 | S3 | S4 |
| A1 | 1 | 0 | 0 | 0 |
| A2 | 0 | 1 | 0 | 0 |
| A3 | 0 | 0 | 1 | 0 |
| A4 | 0 | 0 | 0 | 1 |

Where:
1=HI
0=LOW
S1=Select Address
S2=Select Decrement
S3=Select Increment
S4=Select Poll
A1=New Address
A2=Decremented Address
A3=Incremented Address
A4=Polled Address The prior art program code consists of a number of instructions that load a device's internal register address into an address port and subsequently read or write data to the device internal register to which the address port is pointing.

Figure 6:
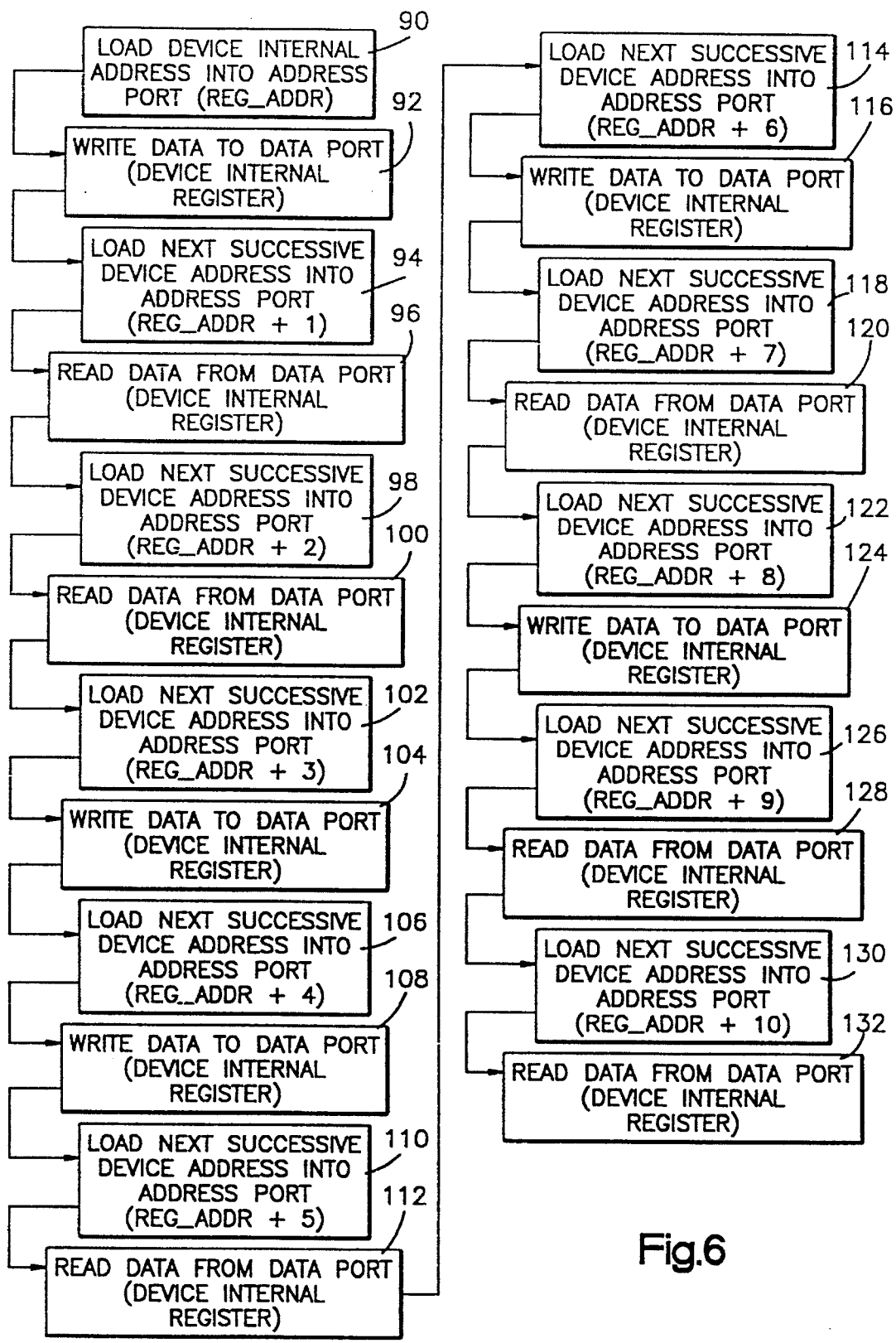
FIG. 6 is a flow chart of the prior art incrementing program code listed in Table 2.

In FIG. 6, a first program element 90 loads a device's internal register address (i.e. REG_ADDR) into a address port register. A second program element 92, writes data to the device's internal register (i.e. REG_ADDR), that is pointed to by the address port register, by storing data in an output data port register. This data is then sent to the device internal register whose address is currently loaded in the address port register. To read a next consecutive device internal register (i.e. REG_ADDR+1), the program needs to load the device's internal register address (i.e. REG_ADDR+1) into the address port register. This is accomplished via program element 94. The program can now read, by means of a read data instruction shown in program element 96, the device's internal register (i.e. REG_ADDR+1) via a data port register.

Similarly, program elements 98, 102, 106, 110, 114, 118, 122, 126, and 130 all serve to load the next consecutive device internal register (i.e. REG_ADDR+2 to REG_ADDR+10) into the address port. Program elements 100, 104, 108, 112, 116, 120, 124, 128, and 132 all either write or read the device's internal register that a previous "load" program element has loaded into the address port. Table 2 and FIG. 6 illustrate that twenty-two (22) program instructions, or elements, are required to perform eleven (11) I/O operations (five (5) write operations and six (6) read operations). Furthermore, the prior art programming method illustrated in Table 2 and FIG. 6 demonstrates that the address port must be loaded a total of ten (10) times, once for each read or write operation.

The present invention comprises an auto incrementing data port. Whenever the auto incrementing data port is read from or written to, the address port will automatically increment to a next address. Through the use of the auto incrementing data port, the number of address port load instructions can be reduced when performing consecutive read or write operations. This allows for an enhanced programming method that provides faster execution time and requires less memory. An enhanced programming method of the present invention is shown in Table 3. A flow chart of the program code in Table 3 is diagrammed in FIG. 7. The enhanced programming method shown in Table 3 is illustrative only and should not be interpreted as limiting. The enhanced programming method of the present invention shown in Table 3 and diagrammed in FIG. 6 is applicable to as many incremental input/output operations as a program requires.

Port Register 208. The device's internal register address (i.e. REG_ADDR) now remains present on the Selector Output Address lines 210. Because the Select Address line 190 is HI, the Load Address line 206 of the Two-input OR gate 204 will go HI. When the Load Address line 206 is driven HI, it will cause the address present (i.e. REG_ADDR) on the Selector Output Address lines 210 to be loaded and latched into the Address Port Register 208. Once the Address Port Register is loaded, the device's internal register address (i.e. REG_ADDR) is then fed into the Address Decoder 212 via the Internal Register Address lines 214 where it is decoded and placed on the Select Internal Register Address lines 224 for the following read or write operation.

The Internal Register Address lines 214 feed the device internal register address (i.e. REG_ADDR) to Selector 194 address input A4, the Increment element 216, and the Decrement element 218. The devices internal register address (i.e. REG_ADDR) is fed into the Increment element 216 by the Internal Register Address lines 214 where it is incremented by one (i.e. from REG_ADDR to REG_

TABLE 3

Enhanced incrementing code utilizing the Auto incrementing Data port

| OUT | ADDR_PORT,REG_ADDR | ;load device internal address into address port |
|---|---|---|
| OUT | DATA_PORT, AL | ;write data to device internal register |
| IN | AL, DATA_PORT | ;read data from device internal register |
| IN | AL, DATA_PORT | |
| OUT | DATA_PORT, AL | |
| OUT | DATA_PORT, AL | |
| IN | AL, DATA_PORT | |
| OUT | DATA_PORT, AL | |
| IN | AL, DATA_PORT | |
| OUT | DATA_PORT, AL | |
| IN | AL, DATA_PORT | |
| IN | AL, DATA_PORT | |

Note: DATA_PORT is the Auto incrementing data port's address.

In all of the Operational Descriptions that follow, the initial states of each line is LOW and all of the address lines are empty (i.e. there is no initial address present). Also, Positive Logic (i.e. the Positive or HI state is equivalent to a logic level of "1" and the more Negative or LOW state is equivalent to a logic level "0") is employed to assist in the understanding of the present invention's operation. The use of Positive logic should not be interpreted as limiting, for Negative Logic (i.e. the Positive or HI state is equivalent to a logic level of "0" and the more Negative or LOW state is equivalent to a logic level of "1") can also be used in the description and implementation of the preferred embodiment.

Figure 7:
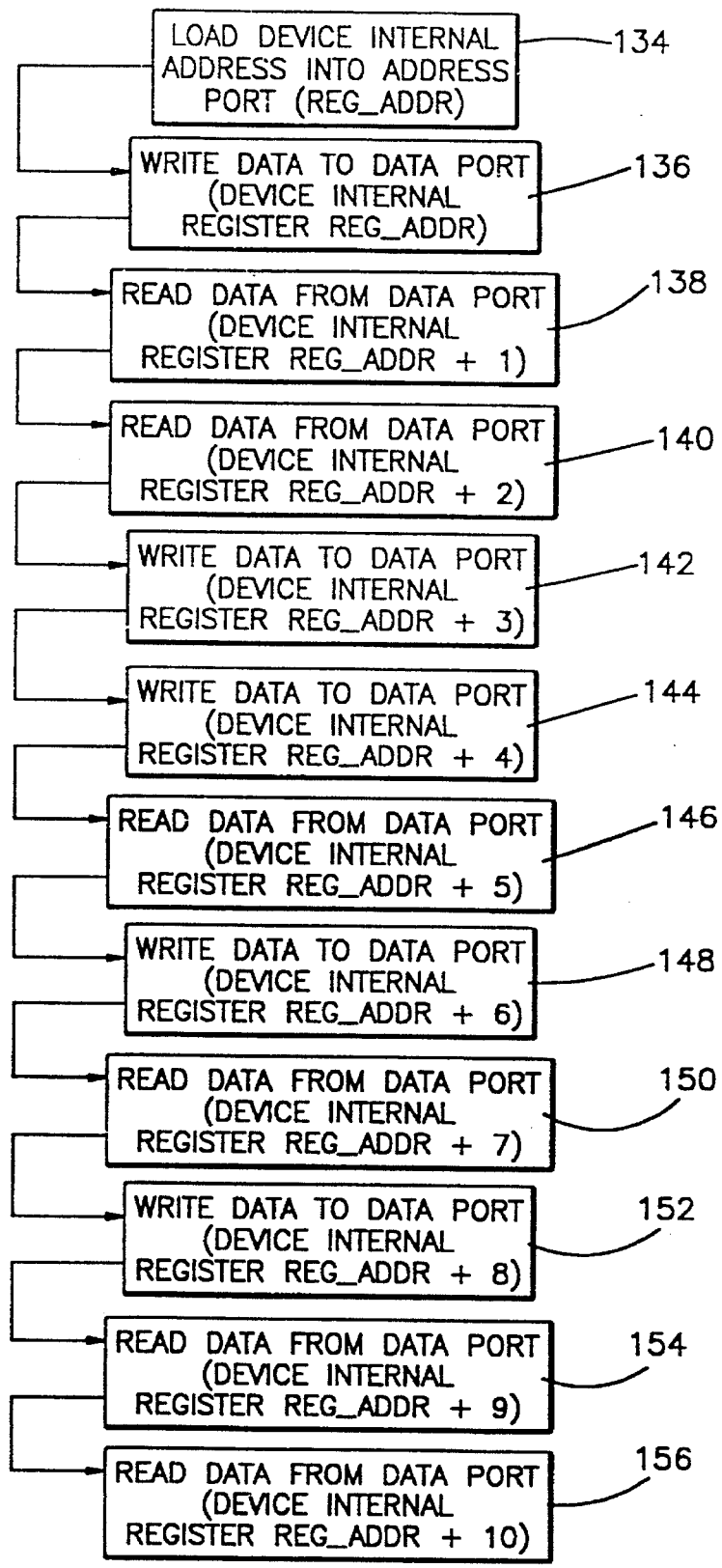
FIG. 7 is a flow chart of the enhanced incrementing program code listed in Table 3.

Referring now to FIGS. 5 and 7, a first program element 134 loads a device's internal address register (i.e. REG_ADDR) into an address port. The Address/Data Port select decoder 170 decodes the incoming address and makes the Select Address line 190 change state from LOW to HI. When the Select address line 190 goes to HI, it causes an address stored (i.e. REG_ADDR) in the Data port buffer/register 181 to appear on the Data port buffer/register output lines 183 and thereby at Selector 194 input A1. The Select Address line 190, currently still in the HI state, is also fed into select input S1 on the Selector 194 and the two-input OR gate 204. When select input S1 on the Selector 194 is HI, it causes the address present at address input A1 (i.e. REG_ADDR) to appear at the output of Selector 194 on the Selector Output Address lines 210 which feed the Address ADDR+1) and fed into the Selector 194 address input A3 via the Increment Address lines 220. The device internal register address present at Selector 194 address input A3 is now REG_ADDR+1. The devices internal register address (i.e. REG_ADDR) is also fed into the Decrement element 268 by the Internal Register Address lines 194 where it is decremented by one (1) (i.e. from REG_ADDR to REG_ADDR−1) and fed into the Selector 194 address input A2 via the Decrement Address lines 222. The device internal register address present at Selector 194 address input A2 is now REG_ADDR−1.

A second program element 136 writes data to the device's internal register (i.e. REG_ADDR) by writing to the auto incrementing data port. The Address/Data Port Select decoder 170 decodes the incoming auto incrementing data port address and causes the Select Data Increment line 186 change from a LOW state to a HI state. The Select Data Increment line 186 is fed to one of three inputs on the Three-input OR gate 198 and to select input S3 on the Selector 194. The HI state of the Select Data Increment line 186 causes the Select Data line 200 to change from a LOW state to a HI state. When the Select Data line 200 is HI, devices on the I/O bus are notified that the data lines are available with data to be written to the device's internal register (i.e. REG_ADDR). The Delay for Cycle End function 202 now waits for the Auto incrementing data port access to be complete before the next address is loaded and latched into the Address port register 208.

Since the Select Data Increment line 186 is HI at select input S3 (as a result of writing to the Auto incrementing data port) of the Selector 194, the Selector Output Address lines 210 contain the incremented device register address present at address input A3 (i.e. REG_ADDR+1); See Table 1. The incremented device register REG_ADDR+1 is now at the input of the Address Port Register 208. The Address Port Register 208 will not load the incremented device register address (i.e. REG_ADDR+1) until the Load Address line 206 changes states from LOW to HI.

When the Auto incrementing data port access is complete, the Cycle Complete output line 203 changes from a LOW to a HI state and is fed into the Two-input OR gate 204. This causes the Load Address line 206 at the output of the Two-input OR gate 204 to change from a LOW to a HI state. This enables the Address Port Register 208 to load the incremented device register address (i.e. REG_ADDR+1) present on the Selector Output Address line 210. The Address Decoder 212 decodes the incremented device's register address (i.e. REG_ADDR+1) and places it on the Select Internal Register Address lines 224 for use in a next read or write operation.

The Internal Register Address lines 214 now feed the device internal register address (i.e. REG_ADDR+1) to Selector 194 address input A4, the Increment element 216, and the Decrement element 218.

The device's internal register address (i.e. REG_ADDR+1) is fed into the Increment element 216 by the Internal Register Address lines 214 where it is incremented by one (1) (i.e. from REG_ADDR+1 to REG_ADDR+2) and fed into the Selector 194 address input A3 via the Increment Address lines 220. The device internal register address present at Selector 194 address input A3 is now REG_ADDR+2.

The devices internal register address (i.e. REG_ADDR+1) is also fed into the Decrement element 218 by the Internal Register Address lines 214 where it is decremented by one (1) (i.e. from REG_ADDR+1 to REG_ADDR) and fed into the Selector 194 address input A2 via the Decrement Address lines 222. The device internal register address present at Selector 194 address input A2 is now REG_ADDR.

A third program element 138 reads data from the device's next consecutive internal register (i.e. REG_ADDR+1) without having to execute a load address instruction. This is accomplished by reading data from the Auto incrementing data port. The Address/Data Port Select decoder 170 decodes the incoming auto incrementing data port address and causes the Select Data Increment line 186 go from LOW to HI. The Select Data Increment line 186 is fed to one of three inputs on the Three-input OR gate 198 and to select input S3 on the Selector 194. The HI state of the Select Data Increment line 186 causes the Select Data line 200 to go to the HI state. When the Select Data line 200 is HI, devices on the I/O bus are notified that the data lines are available with data from the data port registers to be written to the device's internal register (i.e. REG_ADDR+1). The Delay for Cycle End function 202 now waits for the Auto incrementing data port access to be completed before the next address (i.e. REG_ADDR+2) is loaded and latched into the Address port register 208.

Since the Select Data Increment line 186 is HI at select input S3 (as a result of reading from the auto incrementing data port) of the Selector 194, the Selector Output Address lines 210 contain the incremented device register address present at A3 (i.e. REG_ADDR+2); See Table 1. The incremented device register REG_ADDR+2 is now at the input of the Address Port Register 208. The Address Port Register 208 will not load the incremented device register address (i.e. REG_ADDR+2) until the Load Address line 206 changes states from LOW to HI.

When the Auto incrementing data port access is completed, the Cycle Complete output line 203 changes from a LOW to a HI state and is fed into the two-input OR gate 204. This causes the Load Address line 206 at the output of the two-input OR gate 204 to change from a LOW to a HI state. This enables the Address Port Register 208 to load the incremented device register address (i.e. REG_ADDR+2) present on the Selector Output Address line 210. The Address Decoder 212 decodes the incremented device's register address (i.e. REG_ADDR+2) and places it on the Select Internal Register Address lines 224 for use in the next read or write operation.

The Internal Register Address lines 214 feed the device internal register address (i.e. REG_ADDR+2) to Selector 194 address input A4, the Increment element 216, and the Decrement element 218.

The device's internal register address (i.e. REG_ADDR+2) is fed into the Increment element 216 by the Internal Register Address lines 214 where it is incremented by one (1) (i.e. from REG_ADDR+2 to REG_ADDR+3) and fed into the Selector 194 address input A3 via the Increment Address lines 220. The device internal register address present at Selector 194 address input A3 is now REG_ADDR+3.

The devices internal register address (i.e. REG_ADDR+2) is also fed into the Decrement element 218 by the Internal Register Address lines 214 where it is decremented by one (1) (i.e. from REG_ADDR+2 to REG_ADDR+1) and fed into the Selector 194 address input A2 via the Decrement Address lines 222. The device internal register address present at Selector 194 address input A2 is now REG_ADDR+1.

The next read and write operations, program elements 140, 142, 144, 146, 148, 150, 152, 154, and 156, to the next nine (9) consecutive device internal registers (i.e. REG_ADDR+2 to REG_ADDR+10) are performed in a similar manner as described for REG_ADDR and REG_ADDR+1. As described above, the address port is automatically incremented each time the auto incrementing access data port is read or written to via a program instruction.

Figure 7A:
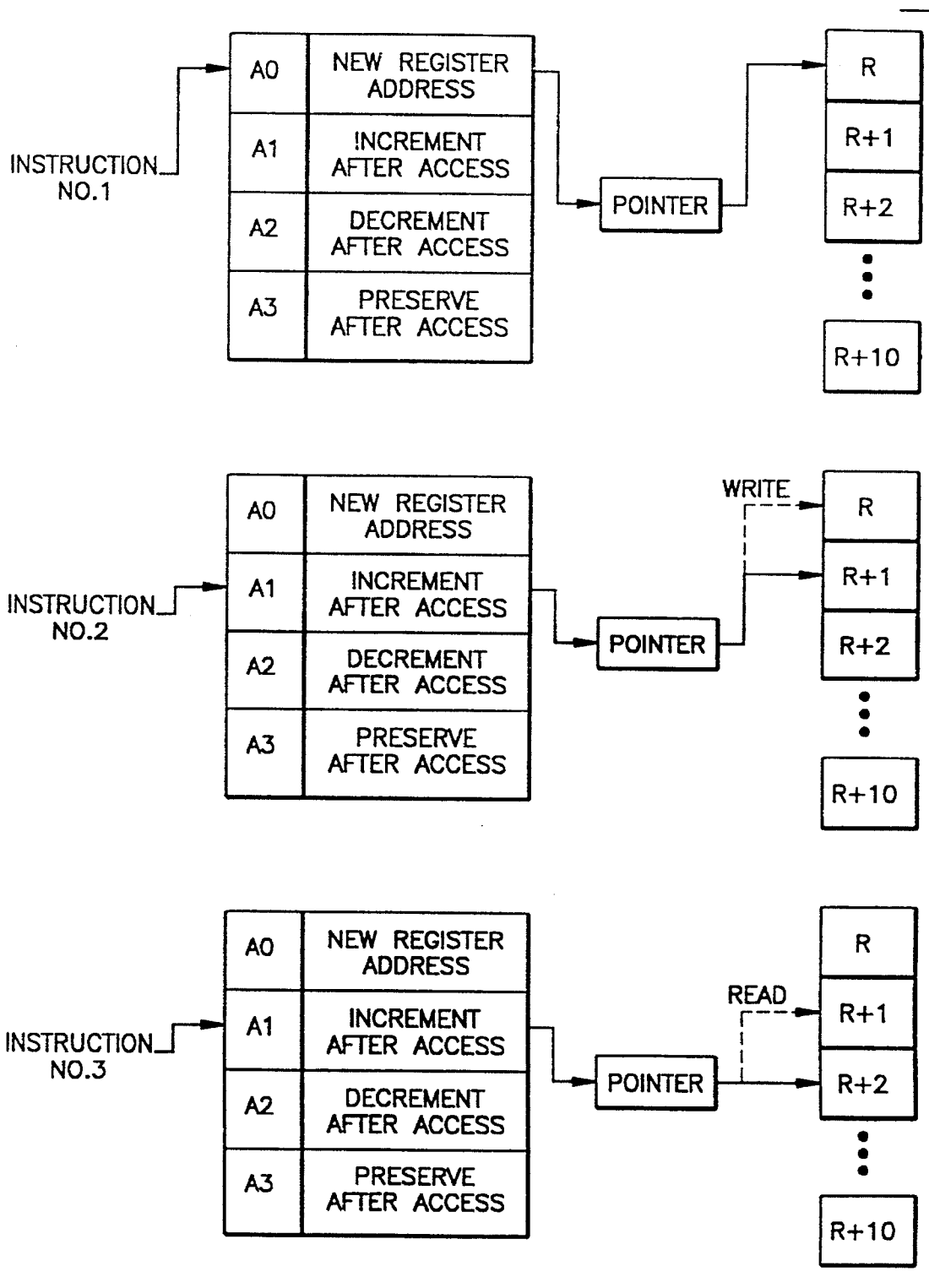
FIG. 7a is a diagram illustrating the first three instructions in the enhanced incrementing code listed in Table 3 and diagrammed in FIG. 7.

A summary of the enhanced incrementing code is shown in simplified form in FIG. 7a. Instruction No. 1 is equivalent to program element 134 (in FIG. 7) and has the effect of loading a new device register address into the Pointer. Instruction No. 2 is equivalent to program element 136 (in FIG. 7) has the effect of writing data to the register (i.e. R) that the Pointer is addressing and after the write access is complete, the Pointer is incremented to the next register address (i.e. R+1). Instruction No. 3 is equivalent to program element 138 (in FIG. 7) and has the effect of reading data from the register (i.e. R+1) that the Pointer is addressing and after the read access is complete, the Pointer is incremented to the next register address (i.e. R+2). After each read/write access is complete, the Pointer continues to increment to the next register address, as long as the auto incrementing data port is addressed by the software.

Referring to Table 2 and FIG. 6, the conventional incrementing programming method requires a total of ten (10) address port load instructions to implement five (5) write and six (6) read operations, for a total of twenty (22) program instructions. The enhanced programming method of the present invention shown in Table 3 and FIG. 7 requires one (1) address port load instruction and five (5)

write and (6) read operations, for a total of 12 program instructions. The enhanced programming method of the present invention reduces the required number of instructions by approximately 45%.

Figure 8:
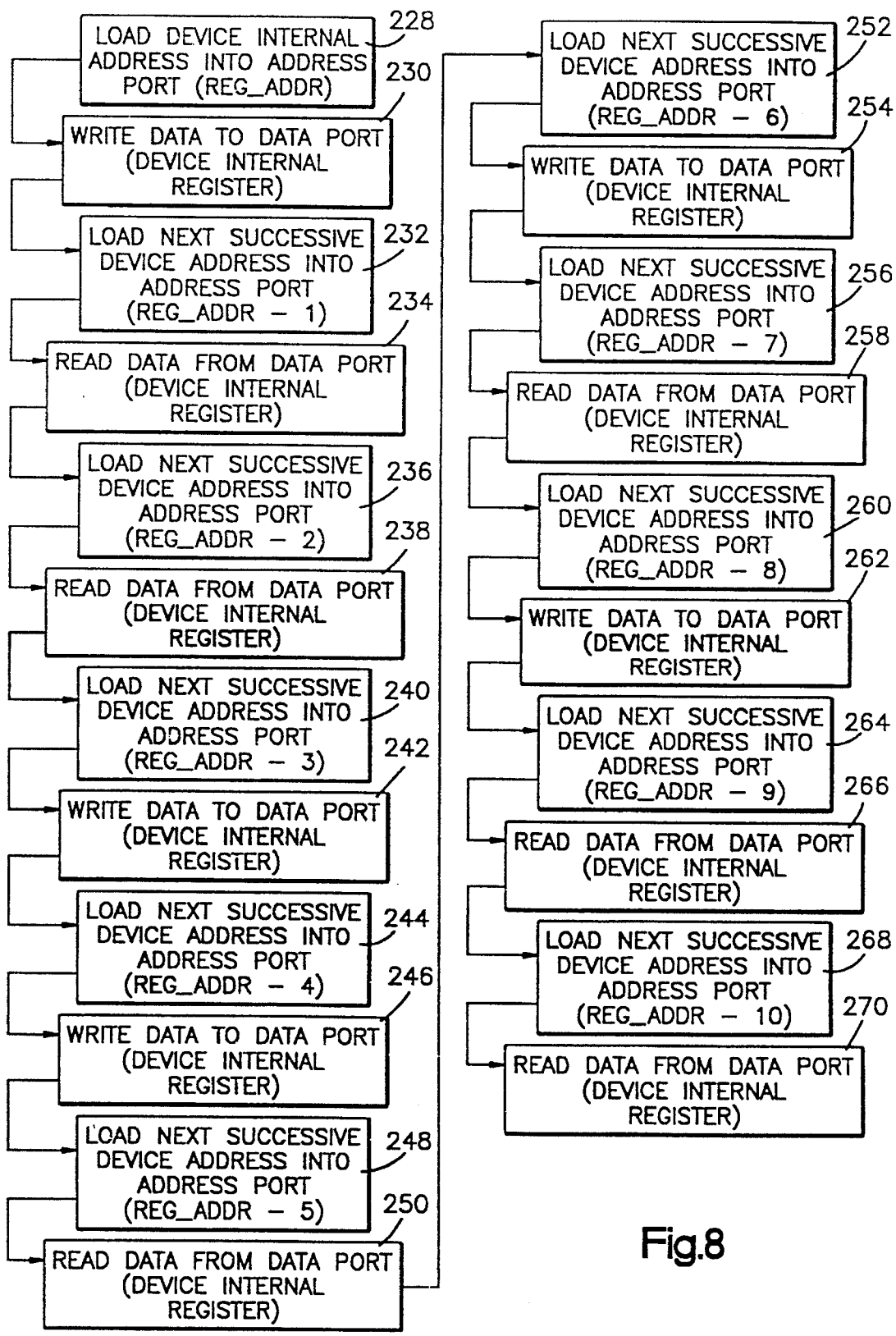
FIG. 8 is a flow chart of the prior art decrementing program code listed in Table 4.
Figure 9:
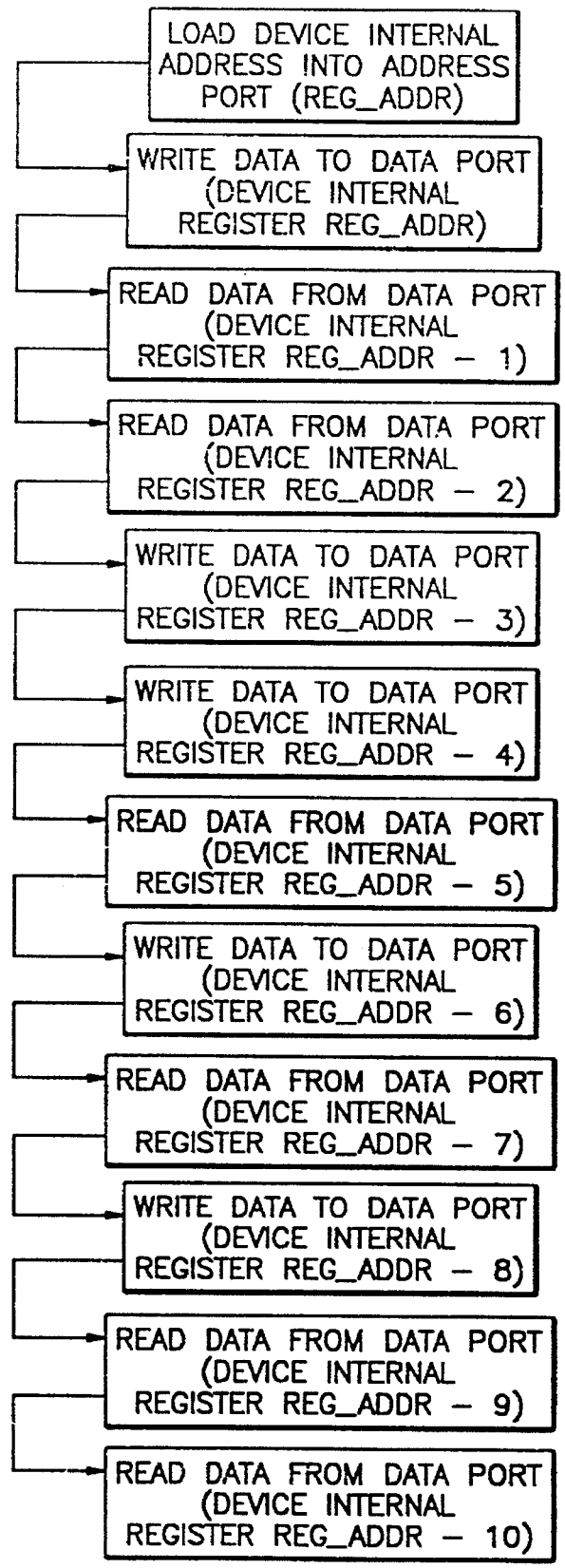
FIG. 9 is a flow chart of the enhanced decrementing program code listed in Table 5.

A prior art method of programming consecutive decremental input and output functions is illustrated in machine independent program code in Table 4 and its associated flow chart is diagrammed in FIG. 8. The program code consists of a number of instructions that load a device's internal register address into an address port and subsequently read or write data to the device internal register that the address port is pointing to.

decrement to a next address. Through the use of the auto decrementing data port, the number of address port load instructions can be reduced when performing consecutive read or write operations. This allows for an enhanced programming method that provides faster execution time and requires less memory. The enhanced programming method of the present invention implementing the prior art programming method of Table 4 and FIG. 8 is shown in the enhanced programming method Table 5 and is diagrammed in FIG. 9.

TABLE 4

Prior Art Decrementing code

| OUT | ADDR_PORT,REG_ADDR | ;load device internal address into address port |
|---|---|---|
| OUT | DATA_PORT, AL | ;write data to device internal register |
| OUT | ADDR_PORT,REG_ADDR−1 | ;load device internal address into address port |
| IN | AL, DATA_PORT | ;read data from device internal register |
| OUT | DATA_PORT,REG_ADDR−2 | |
| IN | AL, DATA_PORT | |
| OUT | ADDR_PORT,REG_ADDR−3 | |
| OUT | DATA_PORT, AL | |
| OUT | ADDR_PORT,REG_ADDR−4 | |
| OUT | DATA_PORT, AL | |
| OUT | ADDR_PORT,REG_ADDR−5 | |
| IN | AL, DATA_PORT | |
| OUT | ADDR_PORT,REG_ADDR−6 | |
| OUT | DATA_PORT, AL | |
| OUT | ADDR_PORT,REG_ADDR−7 | |
| IN | AL, DATA_PORT | |
| OUT | ADDR_PORT,REG_ADDR−8 | |
| OUT | DATA_PORT, AL | |
| OUT | ADDR_PORT,REG_ADDR−9 | |
| IN | AL, DATA_PORT | |
| OUT | ADDR_PORT,REG_ADDR−10 | |
| IN | AL, DATA_PORT | |

Analysis of the prior art decremental code shown in Table 4 and diagrammed in FIG. 8 is identical to the analysis of the prior art incremental code shown in Table 3 and diagrammed in FIG. 6 and thus will not be pursued.

TABLE 5

Enhanced decrementing code utilizing the Auto decrementing Data port

| OUT | ADDR_PORT,REG_ADDR | ;load device internal address into address port |
|---|---|---|
| OUT | DATA_PORT, AL | ;write data to device internal register |
| IN | AL, DATA_PORT | ;read data from device internal register |
| IN | AL, DATA_PORT | |
| OUT | DATA_PORT, AL | |
| OUT | DATA_PORT, AL | |
| IN | AL, DATA_PORT | |
| OUT | DATA_PORT, AL | |
| IN | AL, DATA_PORT | |
| OUT | DATA_PORT, AL | |
| IN | AL, DATA_PORT | |
| IN | AL, DATA_PORT | |

Note: DATA_PORT is the Auto decrementing data port's address.

The present invention comprises an auto decrementing data port. Whenever the auto decrementing data port is read from or written to, the address port will automatically Analysis of the enhanced decrementing code utilizing the Auto decrementing data port is analogous to the analysis of the enhanced incrementing code utilizing the Auto incrementing data port (as shown in Table 3). The only difference is that each time the Auto decrementing Data port is addressed, the pointer generation circuitry 296 (in FIG. 5) routes a decremented address into the Address port register 208 (in FIG. 5) from the Selector 194 (in FIG. 5).

Referring to Table 4 and FIG. 8, the prior art decrementing programming method requires a total of ten (10) address port load instructions to implement five (5) write and six (6) read operations, for a total of twenty (22) program instructions. The enhanced programming method of the present invention requires one (1) address port load instruction and five (5) write and (6) read operations, for a total of 12 program instructions. The enhanced decremental programming method of the present invention reduces the required number of instructions by approximately 45%.

Figure 10:
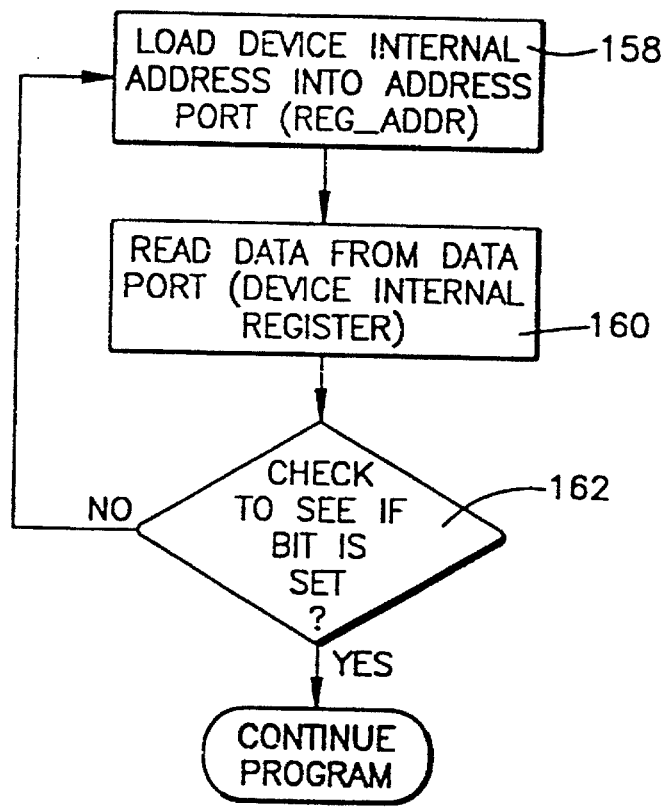
FIG. 10 is a flow chart of the prior art polling program code listed in Table 6.

A prior art method of implementing the "polling" function in machine independent programming code is shown in Table 6 and its associated flow chart is diagrammed in FIG. 10.

element 158 (i.e. load address port) must be executed 50 times. Thus, to "poll" the device's internal register address 50 times, the devices internal register address must be loaded into the address port 50 times.

Figure 11:
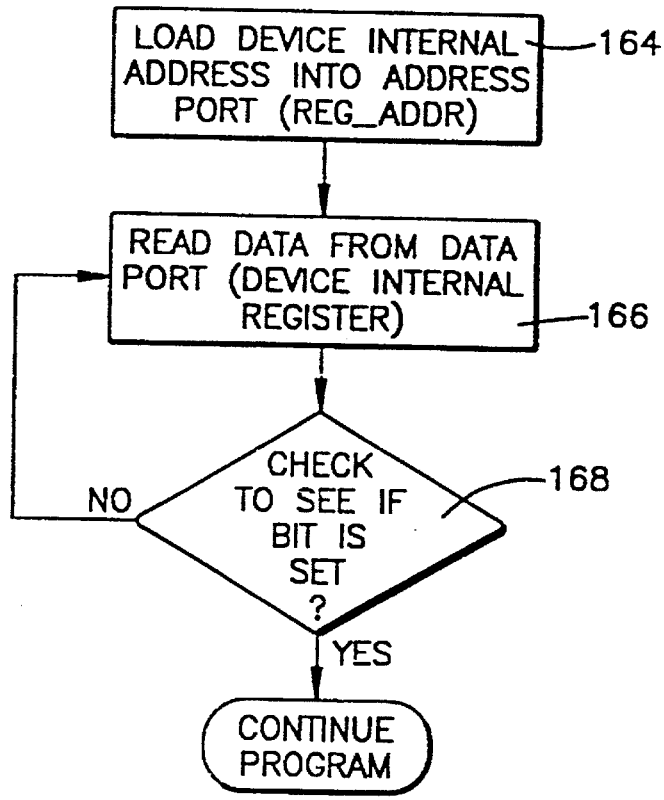
FIG. 11 is a flow chart of the enhanced polling program code listed in Table 7.

An enhanced programming method of the present invention implementing the prior art "polling" code of Table 6 and FIG. 10 is shown in Table 7 and diagrammed in FIG. 11. The enhanced programming code of Table 7 is accomplished through use of a Polling data port provided by the present invention. The Polling data port of the present invention eliminates the need for loading the address port register with a device's internal register address after the internal register has been polled once.

TABLE 6

| Prior Art Polling Code | | |
|---|---|---|
| LOOP: | OUT ADDR_PORT, REG_ADDR | ;load device internal address into address port |
| | IN AL, DATA_PORT | ;read data from device internal register |
| | TEST AL, 80H | ;check to see if bit is set |
| | JZ LOOP | ;jump if bit not set |

A first program element 158 loads an address of a device's internal register that is to be "polled" into the address port register (i.e REG_ADDR). A second program element 160 then reads data from the device's internal register (whose address was loaded into address port register by program element 158) via an input/output data port register.

The data is then checked, or "tested", by a third program element 162 to see if a status bit is set to indicate that a specific data transfer is complete. If the status bit is set, the program continues to the next instruction. If the status bit is not set, the program performs a branch, or "jump", to the program element 158. The branch to program element 158 is typically called a "loop" because the program, in effect, loops to element 158 every time the status bit is not set. The program elements 160 and 162 are then executed again until the status bit is set.

The "polling" program shown in Table 6 and illustrated in FIG. 10 requires four (4) program instructions to implement the loop. One of the program instructions that must be executed in every "loop" is program element 158 (i.e. load device internal address into the address port register). If the program polls a device register fifty (50) times, it then requires the execution of two hundred (200) instructions. Of the two hundred program instructions executed, program

TABLE 7

| Enhanced Polling Code | | |
|---|---|---|
| | OUT ADDR_PORT, REG_ADDR | ;load device internal address into address port |
| LOOP: | IN AL, DATA_PORT | ;read data from device internal reg |
| | TEST AL, 80H | ;check to see if bit is set |
| | JZ LOOP | ;jump if bit not set |

Note: DATA_PORT is the Polling data port's address

Referring now to Table 7 and FIG. 11, a first program element 164 loads a device's internal register address into the address port register. The Address/Data Port select decoder 170 decodes the incoming Address port address and makes the Select Address line 190 change state from LOW to HI. When the Select address line 190 goes to HI, it causes an address stored (i.e. REG_ADDR) in the Data port buffer/register 181 to appear on the Data port buffer/register output lines 183 and thereby at Selector 194 input A1. The Select Address line, currently still in the HI state, is also fed into select input S1 on the Selector 194 and the two-input OR gate 204. When select input S1 on the Selector 194 is HI, it causes the address present at address input A1 (i.e. REG_ADDR) to appear at the output of Selector 194 on the Selector Output Address lines 210 which feed the Address Port Register 208. The device's internal register address (i.e. REG_ADDR) is now present on the Selector Output Address lines 210.

Since the Select Address line 190 is HI, the Load Address line 206 of the two-input OR gate 204 will go HI. When the Load Address line 206 is driven HI, it will cause the address present (i.e. REG_ADDR) on the Selector Output Address lines 210 to be loaded and latched into the Address Port Register 208. Once the Address Port Register 208 is loaded, the device's internal register address (i.e. REG_ADDR) is fed into the Address Decoder 212 via the Internal Register Address lines 214 where it is decoded and placed on the Select Internal Register Address lines 224.

The Internal Register Address lines 214 feed the device's internal register address (i.e. REG_ADDR) to Selector 194 address input A4, the Increment element 216, and the Decrement element 218. The devices internal register address (i.e. REG_ADDR) is fed into the Increment element 216 by the Internal Register Address lines 214 where it is incremented by one (1) (i.e. from REG_ADDR to REG_ADDR+1) and fed into the Selector 194 address input A3 via the Increment Address lines 220. The device internal register address present at Selector 194 address input A3 is now REG_ADDR+1.

The devices internal register address (i.e. REG_ADDR) is also fed into the Decrement element 218 by the Internal Register Address lines 214 where it is decremented by one (1) (i.e. from REG_ADDR to REG_ADDR−1) and fed into the Selector 194 address input A2 via the Decrement Address lines 222. The device internal register address present at Selector 194 address input A4 is REG_ADDR.

A second program element 166, reads the data from the device's internal register that was loaded into the address port by program element 164 via the Polling data port register. The Address/Data Port Select decoder 170 decodes the incoming polling data port register address and causes the Select Data Poll line 184 go from LOW to HI. The Select Data Poll line 184 is fed to one of three inputs on the Three-input OR gate 198 and to select input S4 on the Selector 194. The HI state of the Select Data Poll line 188 causes the Select Data line 200, of the three-input OR gate 198, to go to the HI state. The Select Data line 200 is connected to the Delay for Cycle End function 202 and the I/O bus. When the Select Data line 200 is HI, devices on the I/O bus are notified that the Output data lines 226 are available for data stored in REG_ADDR to be written to the polling data port register. The Delay for Cycle End function 202 now waits for the Polling data port access to be completed before the same address (i.e. REG_ADDR) is loaded and latched into the Address port register 208.

Since the Select Data Poll line 184 is HI at select input S4 of the Selector 194 (as a result of accessing the Polling data port), the Selector Output Address lines 210 contain the device's register address present at address input A4 (i.e. REG_ADDR); See Table 1. The device's internal register address, REG_ADDR, is now at the input of the Address Port Register 208. The Address Port Register 208 will not load the device's internal register address (i.e. REG_ADDR) until the Load Address line 206 changes states from LOW to HI.

When the Polling data port access is complete, the Cycle Complete output line 203 changes from a LOW to a HI state and is fed into the two-input OR gate 204. This causes the Load Address line 206 at the output of the two-input OR gate 204 to change from a LOW to a HI state. This enables the Address Port Register 208 to load the polled device's internal register address (i.e. REG_ADDR) present on the Selector Output Address line 210. The Address Decoder 212 decodes the polled device's internal register address (i.e. REG_ADDR) and places it on the Select Internal Register Address lines 224 for use in the next read operation.

The data stored in the Polling data port is then checked, or "tested", by a third program element 168 to see if a data bit is set to indicate that the transfer is complete. If the data bit is set, the program continues to the next instruction. If the data bit is not set, the program performs a branch, or "jump", to program element 166.

The device's internal register is then "polled" again without having to load the device's internal register address into the address port. This is accomplished by reading from the Polling data port via program element 166.

The Address/Data Port Select decoder 170 decodes the incoming Polling data port address and causes the Select Data Poll line 184 go from LOW to HI. The Select Data Poll line 184 is fed to one of three inputs on the three-input OR gate 198 and to select input S4 on the Selector 194. The HI state of the Select Data Poll line 188 causes the Select Data line 200, of the three-input OR gate 198, to go to the HI state. When the Select Data line 200 is HI, devices on the I/O bus are notified that the Output data lines 226 are available for data stored in REG_ADDR to be written to the polling data port register. The Delay for Cycle End function 202 now waits for the Polling data port access to be completed before the same address (i.e. REG_ADDR) is loaded and latched into the Address port register 208.

Since the Select Data Poll line 184 is HI at select input S4 of the Selector 194 (as a result of accessing the Polling data port), the Selector Output Address lines 210 contain the device's register address present at address input A4 (i.e. REG_ADDR); See Table 1. The device's internal register address, REG_ADDR, is now at the input of the Address Port Register 208. The Address Port Register 208 will not load the device's internal register address (i.e. REG_ADDR) until the Load Address line 206 changes states from LOW to HI.

When Polling data port access is complete, the Cycle Complete output line 203 changes from a LOW to a HI state and is fed into the two-input OR gate 204. This causes the Load Address line 206 at the output of the two-input OR gate 204 to change from a LOW to a HI state. This enables the Address Port Register 208 to load the polled device's internal register address (i.e. REG_ADDR) present on the Selector Output Address line 210. The Address Decoder 212 decodes the polled device's internal register address (i.e. REG_ADDR) and places it on the Select Internal Register Address lines 224 for use in the next read operation.

The data stored in the Polling data port is then checked, or "tested", again by program element 168 to see if a data bit is set to indicate that the transfer is complete. If the data bit is set, the program continues to the next instruction. If the data bit is not set, the program performs a branch, or "jump", to program element 166 and the device's internal register is "polled" again. The loop is repeated until the tested condition is satisfied.

The enhanced programming method illustrated requires three (3) instructions to implement the "polling" loop. If the enhanced program polls a device register fifty (50) times, it then requires the execution of one hundred fifty-one (151) instructions instead of the two hundred (200) required by the conventional polling method illustrated in FIG. 10. This allows the enhanced programming method to execute the loop quicker and thereby reduce the amount of execution time required to perform "polling" operations.

Although the description above contains many specificities, these should not be construed as limiting the scope of the invention but as merely as providing illustrations of some of the presently preferred embodiments of the invention. For example, some of the functions, such as registers and decoders may be combined into single functional units; increment and decrement elements may be implemented via a single Up/Down counter; and the increment and decrement values may by any number (instead of one (1)).

Thus, the scope of the invention should be determined by the appended claims and their legal equivalents, rather than by the examples given.

What is claimed is:

1. A device for use in a computer system having a CPU coupled to a data bus and an address bus comprising:

(a) a first address decoder configured to be placed in circuit communication with the CPU via the address bus and further configured to decode the address bus into a first signal corresponding to a first address on the address bus and a second signal corresponding to a second address on the address bus;

(b) a plurality of registers each of which is configured to store a data value and which is accessible by the CPU via the data bus;

(c) a register pointer in circuit communication with said plurality of registers, configured to store a pointer value, and further configured to select any one of said plurality of registers responsive to the pointer value stored in said register pointer;

(d) pointer generation circuitry in circuit communication with said address decoder and said register pointer and configured to modify the register pointer responsive to an access of said first address of the address bus and further configured to preserve the state of said register pointer responsive to an access of said second address of the address bus.

2. The device of claim 1 wherein said pointer generation circuity is configured to increment the register pointer responsive to access of said first signal.

3. The device of claim 1 wherein said pointer generation circuity is configured to decrement the register pointer responsive to access of said first signal.

4. The device of claim 1 wherein said register pointer comprises:

(a) a writable register in circuit communication with the data bus and (b) a second address decoder in circuit communication with said writable register and said plurality of registers.

5. The device of claim 1 wherein said pointer generation circuitry comprises: a selector in circuit communication with said first address decoder, a pass-through, and counter all of which are in circuit communication with said register pointer.

6. The device of claim 5 wherein said counter is in the form of an incrementor.

7. The device of claim 5 wherein said counter is in the form of a decrementor.

8. The device of claim 1 wherein said pointer generation circuitry comprises: a selector in circuit communication with said address decoder, a pass-through, an incrementor, and a decrementor all of which are in circuit communication with said register pointer.

9. A method of using a CPU to access data stored within a plurality of registers, wherein the CPU is coupled to an address bus and a data bus, comprising the steps of:

(a) providing a register pointer in circuit communication with said plurality of registers, configured to store a pointer value, and further configured to select any one of said plurality of registers responsive to the pointer value stored in said register pointer (b) providing an address decoder in circuit communication with said register pointer and configured to decode the address bus into a first signal corresponding to a first address on the address bus and a second signal corresponding to a second address on the address bus;

(c) accessing via the data bus the contents of the register of said plurality of registers pointed to by said register pointer responsive to accesses of said first and second addresses of the address bus;

(d) modifying said register pointer responsive to an access of said first address of the address bus; and (e) preserving the state of said register pointer responsive to an access of said second address of the address bus.

10. The device of claim 9 wherein modifying said register pointer responsive to an access of said first address includes incrementing.

11. The device of claim 9 wherein modifying said register pointer responsive to an access of said first address includes decrementing.

12. A method of using a CPU to access data stored within a plurality of registers, wherein the CPU is coupled to an address bus and a data bus, comprising the steps of:

(a) providing a register pointer in circuit communication with said plurality of registers, configured to store a pointer value, and further configured to select any one of said plurality of registers responsive to the pointer value stored in said register pointer;

(b) providing an address decoder in circuit communication with said register pointer and configured to decode the address bus into a first signal corresponding to a first address on the address bus, a second signal corresponding to a second address on the address bus, and a third signal corresponding to a third address on the address bus;

(c) accessing via the data bus the contents of the register of said plurality of registers pointed to by said register pointer responsive to accesses of said first, second, and third addresses of the address bus;

(d) incrementing said register pointer responsive to an access of said first address of the address bus;

(e) decrementing said register pointer responsive to an access of said second address of the address bus; and (f) preserving the state of said register pointer responsive to an access of said third address of the address bus.

13. A method of "polling" a devices internal register comprising:

(a) loading an address port with a device's internal register address that is to be "polled" via a first program instruction, (b) reading said device's internal register by reading from a polling data port via a second program instruction, (c) loading said address port with said device's internal register address automatically without having to use a program instruction, (d) testing data read from said device's internal register address via a third program instruction, and (e) repeating steps (b), (c), and (d) without repeating step (a) until said testing in step (d) is satisfied.

* * * * *